United States Patent
Kwong et al.

(10) Patent No.: US 10,070,428 B2
(45) Date of Patent: Sep. 4, 2018

(54) METHOD AND APPARATUS FOR EFFICIENT TRANSMISSION FROM A DORMANT STATE

(71) Applicant: Telefonaktiebolaget L M Ericsson (publ), Stockholm (SE)

(72) Inventors: Waikwok Kwong, Solna (SE); Sofia Brismar, Lidingö (SE); Fredrik Ovesjö, Älvsjö (SE); Jose Luis Pradas, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 22 days.

(21) Appl. No.: 14/895,456

(22) PCT Filed: Nov. 17, 2015

(86) PCT No.: PCT/SE2015/051238
§ 371 (c)(1),
(2) Date: Dec. 2, 2015

(87) PCT Pub. No.: WO2016/080897
PCT Pub. Date: May 26, 2016

(65) Prior Publication Data
US 2016/0295556 A1    Oct. 6, 2016

Related U.S. Application Data

(60) Provisional application No. 62/081,108, filed on Nov. 18, 2014.

(51) Int. Cl.
*H04W 72/04*   (2009.01)
*H04W 76/27*   (2018.01)
(Continued)

(52) U.S. Cl.
CPC ......... *H04W 72/042* (2013.01); *H04W 72/14* (2013.01); *H04W 76/021* (2013.01);
(Continued)

(58) Field of Classification Search
CPC . H04W 72/042; H04W 72/14; H04W 76/021; H04W 76/046; H04W 8/02; H04W 8/26; H04W 60/00; H04W 88/02
See application file for complete search history.

(56) References Cited

U.S. PATENT DOCUMENTS

2008/0293416 A1   11/2008   Yi et al.
2009/0042560 A1   2/2009    Islam et al.
(Continued)

OTHER PUBLICATIONS

Unknown Author, "Access control—overview on scenarios and focus areas", 3GPP TSG-RAN WG2 #81 bis R2-131092, Chicago, Apr. 15-19, 2013, 1-4.
(Continued)

*Primary Examiner* — Jae Y Lee
(74) *Attorney, Agent, or Firm* — Murphy, Bilak & Homiller, PLLC

(57) ABSTRACT

In an aspect, a wireless terminal, operating in a wireless communication system with distinct areas that each include base stations, transmits a data packet to a network node on a common channel. The data packet includes a header with an identifier that is an area-specific identifier for the wireless terminal. The wireless terminal has been allocated an area-specific identifier but not a cell-specific identifier. A network node of the wireless communication system receives the data packet sent from the wireless terminal. The network node associates the area-specific identifier for the wireless terminal in the data packet with a network-wide identifier for the wireless terminal and handles the data packet according to the network-wide identifier.

19 Claims, 14 Drawing Sheets

(51) Int. Cl.
*H04W 76/11* (2018.01)
*H04W 76/04* (2009.01)
*H04W 72/14* (2009.01)
*H04W 76/02* (2009.01)
*H04W 8/02* (2009.01)
*H04W 8/26* (2009.01)
*H04W 60/00* (2009.01)
*H04W 88/02* (2009.01)

(52) U.S. Cl.
CPC .......... *H04W 76/046* (2013.01); *H04W 76/11* (2018.02); *H04W 76/27* (2018.02); *H04W 8/02* (2013.01); *H04W 8/26* (2013.01); *H04W 60/00* (2013.01); *H04W 88/02* (2013.01)

(56) References Cited

U.S. PATENT DOCUMENTS

| | | | |
|---|---|---|---|
| 2012/0207045 A1* | 8/2012 | Pelletier | H04B 7/0404 370/252 |
| 2013/0182586 A1 | 7/2013 | Paladugu et al. | |
| 2013/0250883 A1* | 9/2013 | Guo | H04W 68/00 370/329 |
| 2015/0009887 A1* | 1/2015 | Chen | H04W 48/10 370/312 |
| 2015/0334740 A1* | 11/2015 | Yang | H04W 72/14 370/329 |
| 2016/0081115 A1* | 3/2016 | Pang | H04W 56/001 370/329 |

OTHER PUBLICATIONS

Unknown Author, "Extended URA_PCH state", 3GPP TSG-RAN WG2 Meeting #87bis R2-144412 Shanghai, China, Oct. 6-10, 2014, 1-8.

3GPP, "Technical Specification Group Radio Access Network; Radio Resource Control (RRC); Protocol specification (Release 12)", 3GPP TS 25.331 V12.3.0, Sep. 2014, 1-2204.

* cited by examiner

MAC-i header (for data)

| LCH-ID | L (length) | F |
|---|---|---|

MAC-i header 0 (for E-RNTI attachement)

| 1111 | Spare | E-RNTI |
|---|---|---|

MAC-i header u (for uE-RNTI attachement)

| 1101 | uE-RNTI |
|---|---|

Some specific choices of MAC-i header for uE-RNTI attachment:

| 1101 | Spare | 32-bit U-RNTI |
|---|---|---|

| 1101 | lower 28 bit of U-RNTI |
|---|---|

| 1101 | xE-RNTI | E-RNTI |
|---|---|---|

| 1111 | xE-RNTI | E-RNTI |   ( xE-RNTI ≠ 0000 )
|---|---|---|

Logical Channel ID assignment for common E-DCH transmission

| LCH-ID | Designation |
|---|---|
| 0000–1100 | Data for Logical Channel 1–13 |
| 1101 | uE-RNTI attachment |
| 1110 | CCCH transmission |
| 1111 | E-RNTI attachement |

TRANSMIT A DATA PACKET TO A NETWORK NODE IN THE WIRELESS COMMUNICATION SYSTEM, ON A COMMON CHANNEL, THE DATA PACKET COMPRISING A HEADER WITH AN IDENTIFIER FOR THE WIRELESS TERMINAL, WHEREIN THE IDENTIFIER IS AN AREA-SPECIFIC IDENTIFIER FOR THE WIRELESS TERMINAL
902

*FIG. 9*

METHOD AND APPARATUS FOR EFFICIENT TRANSMISSION FROM A DORMANT STATE

TECHNICAL FIELD

Embodiments herein relate to wireless communication systems, such as telecommunication systems, and more particularly relate to techniques for improving the efficiency of transmissions to and from wireless devices in a dormant activity state.

BACKGROUND

Wireless communication devices, also known as, e.g., User Equipments (UEs), mobile terminals, wireless terminals, and/or mobile stations, operate in a wireless or cellular communications network or a wireless communication system, sometimes also referred to as a cellular radio system or cellular networks. The communication may be performed, for example, between two terminals, between a terminal and a regular telephone and/or between a terminal and a server, and is carried out via a Radio Access Network (RAN) and possibly one or more core networks comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

Examples of radio access networks include several standardized by members of the $3^{rd}$-Generation Partnership Project (3GPP), including: the Long Term Evolution (LTE) system, more formally known as the Evolved Universal Terrestrial Radio Access Network (E-UTRAN); and the Universal Terrestrial Radio Access Network (UTRAN), sometimes referred to as the UMTS Terrestrial Radio Access Network and often referred to as simply the WCDMA (Wideband Code-Division Multiple Access) network.

The UTRAN is one component of the Universal Mobile Telecommunications System (UMTS), which is a third generation mobile cellular technology for networks based on the Global system For Mobile (GSM) standard. UMTS employs Wideband Code Division Multiple Access (WCDMA) radio access technology to offer greater spectral efficiency and bandwidth to mobile network operators. UMTS specifies a complete network system covering the UTRAN, the core network (Mobile Application Part, or MAP), and the authentication of users via Subscriber Identity Module (SIM) cards.

More generally, a cellular communications network covers a geographical area which is divided into cell areas, wherein each cell area is served by an access node such as a base station, e.g. a Radio Base Station (RBS), which may be referred to as, for example, "eNB", "eNodeB", "Node B", "B node", or BTS (Base Transceiver Station), depending on the technology and terminology used. The base stations may be of different classes, such as macro eNodeB, home eNodeB or pico base station, based on transmission power and also cell size.

A cell is the geographical area over which radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

Within a given RAN, multiple cells may be grouped into "registration areas." In UTRAN, for example, these registration areas are referred to as UTRAN Registration Areas (URAs). These areas are designed to reduce the amount of signaling required between the network and inactive (but moving) terminals. A terminal moving from one cell to another cell that is within the same registration area is not required (as a general matter) to send an update (called a URA-Update, in 3GPP specifications for UTRAN), while a terminal moving from a cell in a first registration area to a cell in a second registration must notify the network (e.g., with a URA-Update message) that the registration area for reaching the terminal has changed. The implication of this behaviour is that the network does not know exactly where the inactive mobile terminal is, within the registration area, and must therefore broadcast any pages for the terminal from all cells within the registration area.

When the terminal needs to communicate with the network, e.g., when it has data to send or when it is paged by the network, it needs to notify the network (e.g., with a Cell-Update message) of the cell it is currently camping on in order to secure the necessary resources for the communication.

A concept of operational states has been incorporated in radio access technologies such as the 3GPP radio communication standards. In 3GPP systems operating according to WCDMA and LTE, the different operational states are called Radio Resource Control (RRC) states and include an idle state and several connected states. In WCDMA, there are five RRC states; Cell_DCH, Cell_FACH, URA_PCH, Cell_PCH, and Idle.

In a WCDMA system, a UE that has established an RRC Connection, i.e., a UE in UTRA RRC Connected mode, can be configured by the network to be in one of four connected RRC states at a given time: Cell_DCH, Cell_FACH, URA_PCH and Cell_PCH. The UTRA RRC Connected mode is further described in 3GPP Technical Specification (TS) 25.331 version 12.3.0. Each RRC state is characterized, among other things, by different achievable bitrates and cost in terms of resource utilization and energy.

A UE in CELL_DCH state, starting a web browsing session, will perceive a better user experience than a UE in other RRC states. If a UE is in other RRC states than CELL_DCH, a quick up switch to CELL_DCH will often improve the user experience by improving the screen response time and the total download time. However, unnecessary up-switches to CELL_DCH states should be avoided due to the higher cost of this RRC state in terms of network resources and UE battery consumption.

A wireless terminal that is sending only small amounts of data spends most of its time in a dormant state, so as to minimize the amount of power consumption. In a UMTS radio network, an inactive device may be configured to stay in the IDLE mode or one of the connected mode states URA_PCH, CELL_PCH, or CELL_FACH.

A wireless terminal in IDLE mode has no dedicated radio connection towards the RAN. There is also no dedicated connection for the terminal between the RAN and the Mobile Core Network (CN). As a result, connections need to be established before any data can be transmitted. The connection setup from IDLE mode begins with the wireless terminal making an autonomous transition to CELL_FACH state. The wireless terminal then initiates an RRC Connection Setup procedure to set up a dedicated radio connection. Next, a connection towards the CN is set up, which involves Authentication and Ciphering, Security Mode, and Radio Access Bearer Setup procedures, and possibly also a packet data protocol (PDP) Context Activation procedure, if one does not already exist. It is only then that the wireless terminal is able to transmit its data. Furthermore, after data transmission, the radio and CN connections need to be released before the wireless terminal can return to IDLE mode. This is illustrated in FIG. 1. Obviously, this procedure requires a lot of signaling, and may involve an inefficient use of network resources when small amounts of data are transmitted from time to time.

In connected mode, in contrast to IDLE mode, the wireless terminal does have a connection to the CN. There is, however, no dedicated radio connection for the states CELL_FACH, CELL_PCH, and URA_PCH. To transmit data in a cell, the wireless terminal needs cell-specific dedicated identities such as cell radio network temporary identity (c-RNTI), high speed downlink shared channel RNTI (H-RNTI), and E-DCH RNTI (E-RNTI) to identify itself. These cell-specific dedicated identities are unique to a given wireless terminal within a specific cell, but do not serve to identify the wireless terminal outside the cell. Wireless terminals that are in the CELL_DCH, CELL_FACH and CELL_PCH states are known to the RAN at the cell level. Wireless terminals in CELL_DCH and CELL_FACH are always allocated cell-specific identities, while those in the CELL_PCH state may or may not be allocated the identities. Wireless terminals in URA_PCH state are not known to the RAN at the cell-level, and are not allocated the identities.

A wireless terminal in the CELL_PCH or CELL_FACH state needs to perform a Cell Update whenever it moves into another cell. A wireless terminal in the URA_PCH state, on the other hand, can move around freely within the URA, which is usually made up of a significant number of cells. A wireless terminal that is inactive but moving is generally best served in the URA_PCH state, since this state does not require frequent signaling so long as no data is transmitted to or from the terminal.

Wireless terminals with cell-specific dedicated identities can send and receive data directly on the common channels for the CELL_FACH states, including the random access channel (RACH), the forward access channel (FACH), the common enhanced dedicated channel (common E-DCH), and the high-speed downlink shared channel (HS-DSCH).

Wireless terminals that do not have cell specific dedicated identities, which includes those terminals in URA_PCH state, must acquire the identities before sending or receiving data. This is done via the Cell Update procedure. For downlink data, the wireless terminal is first notified that data for the wireless terminal is available, using the Paging mechanism. The Cell Update procedure is illustrated in FIG. 2. In the Cell Update and Paging procedures, the UE is identified by its U-RNTI which is unique within the entire Public Land Mobile Network (PLMN). The U-RNTI is made up of a Radio Network Controller (RNC) ID and an S-RNTI.

The medium access control (MAC)-i and MAC-is protocols are used for transmission on common E-DCH in CELL_FACH. Each data transmission is accompanied by MAC-i/is headers. The MAC-i header includes information on the Logical Channel ID and the length of the MAC-is service data unit (SDU). When a wireless terminal is granted permission after random access to transmit on a common E-DCH, it starts by attaching its E-RNTI in a special MAC-i header called the MAC-i header 0. The purpose is to identify the wireless terminal and to perform collision resolution.

A collision occurs when two wireless terminals are trying to access at the same time using the same random access signature. Since random access is granted by signature, the network, intending to grant access to one wireless terminal, may have inadvertently granted access to both. Collisions are avoided by acknowledging the wireless terminal with an Absolute Grant (AG) sent on the enhanced absolute grant channel (E-AGCH). The AG contains the wireless terminal's E-RNTI, masked by a cyclic redundancy code (CRC), and information on the amount of data that can be sent. On reception of the AG, which is addressed to the wireless terminal via its E-RNTI, the wireless terminal knows that it has successfully acquired the common E-DCH. If the AG is not received within a certain amount of time, the wireless terminal would release the common E-DCH and try again.

The E-AGCH is a common channel that many wireless terminals can monitor at the same time. It carries the following information:
  5-bit Absolute Grant Value: Indicates (via a power ratio) the amount of data the wireless terminal is allowed to transmit.
  1-bit Absolute Grant Scope: Indicates if hybrid automatic repeat request (HARQ) process activation/deactivation should be applied to all HARQ processes or just the HARQ process pointed to by the AG.
  16-bit CRC masked UE Identity (E-RNTI): Identifies the recipient of the AG.
For the last field, a 16-bit CRC is calculated from the 6 bits of the AG Value and the AG Scope. The CRC is then used to mask the E-RNTI.

HS-DSCH transmissions in CELL_FACH state are scheduled on the High Speed Shared Control Channel (HS-SCCH). The HS-SCCH includes the following transmission details: 7-bit Channelization-code-set info; 1-bit Modulation scheme info; 6-bit Transport Block Size (TBS) info; 3-bit Hybrid-ARQ process info; 3-bit Redundancy and constellation version; 1-bit New data indicator; and 16-bit UE Identity such as HS-DSCH RNTI (H-RNTI). Upon reception of an HS-SCCH transmission with the wireless terminal's H-RNTI, the wireless terminal knows, from the timing defined in the 3GPP specification, when to receive the data on the HS-DSCH.

SUMMARY

As shown in FIG. 2, transmission of data from the URA_PCH state requires a wireless terminal to first perform a Cell Update procedure, which involves the exchange of several RRC messages, typically, a CELL UPDATE on the uplink, a CELL UPDATE CONFIRM on the downlink, and a UTRAN MOBILITY INFORMATION CONFIRM on the uplink again. It is only after this signaling procedure has been completed that the wireless terminal may send or receive data. This procedure introduces a considerable delay and, for the transmission of a small amount of data, a relatively large overhead.

To address these problems, the present disclosure introduces a new concept of a URA-wide dedicated user identity for wireless terminals. This URA-wide dedicated user identity allows a wireless terminal to transmit and receive data in a cell without the need to allocate cell-specific user identities. This means that a wireless terminal in URA_PCH state can transmit and receive data without the need to perform a Cell Update procedure. The techniques and apparatus disclosed herein thus reduce the latency for data transmission starting from a dormant state such as the URA_PCH state. It also makes it much more efficient to transmit small amounts of data starting from such a state.

According to some embodiments, a method, in at least one network node of a wireless communication system comprising a plurality of distinct areas, each area comprising a plurality of cells, includes receiving a data packet sent from a wireless terminal on a common channel. The data packet includes a header with an identifier for the wireless terminal, and the identifier is an area-specific identifier for the wireless terminal. The method also includes associating the area-specific identifier for the wireless terminal with a network-wide identifier for the wireless terminal and handling the data packet according to the network-wide identifier.

According to some embodiments, a method, in at least one network node of a wireless communication system comprising a plurality of distinct areas, each area comprising a plurality of cells, includes receiving, from a core network node, data for a wireless terminal having a network-wide identifier. The method also includes associating the network-wide identifier for the wireless terminal with an area-specific identifier for the wireless terminal and sending the data to the wireless terminal in a data packet comprising a header with an identifier for the wireless terminal. The identifier is the area-specific identifier for the wireless terminal.

According to some embodiments, a method in a wireless terminal operating in a wireless communication system comprising a plurality of distinct areas, each area comprising a plurality of cells, includes transmitting a data packet to a network node in the wireless communication system, on a common channel, the data packet comprising a header with an identifier for the wireless terminal, wherein the identifier is an area-specific identifier for the wireless terminal. The wireless terminal has been allocated an area-specific identifier but not a cell-specific identifier.

According to some embodiments, a network node for use in a wireless communication system comprising a plurality of distinct areas, each area comprising a plurality of cells, includes a radio transceiver configured to communicate with one or more wireless terminals and a processing circuit. The processing circuit is configured to receive, via the radio transceiver, a data packet sent from a wireless terminal on a common channel. The data packet includes a header with an identifier for the wireless terminal, and the identifier is an area-specific identifier for the wireless terminal. The processing circuit is configured to associate the area-specific identifier for the wireless terminal with a network-wide identifier for the wireless terminal and handle the data packet according to the network-wide identifier.

According to some embodiments, a network node for use in a wireless communication system comprising a plurality of distinct areas, each area comprising a plurality of cells, includes a radio transceiver configured to communicate with one or more wireless terminals and a processing circuit. The processing circuit is configured to receive, from a core network node, data for a wireless terminal having a network-wide identifier. The processing circuit is also configured to associate the network-wide identifier for the wireless terminal with an area-specific identifier for the wireless terminal and send the data to the wireless terminal in a data packet comprising a header with an identifier for the wireless terminal. The identifier is the area-specific identifier for the wireless terminal.

According to some embodiments, a wireless terminal, operating in a wireless communication system comprising a plurality of distinct areas, each area comprising a plurality of cells, is allocated an area-specific identifier but not a cell-specific identifier. The wireless terminal includes a radio transceiver configured to communicate with one or more wireless terminals and a processing circuit. The processing circuit is configured to transmit a data packet to a network node in the wireless communication system, on a common channel, the data packet comprising a header with an identifier for the wireless terminal, wherein the identifier is an area-specific identifier for the wireless terminal.

It will be appreciated that the techniques and apparatus described herein are not limited to those enumerated embodiments, but further encompass variations and extensions of these embodiments, according to the details provided below.

BRIEF DESCRIPTION OF THE DRAWINGS

FIG. 4 illustrates MAC-i header formats and Logical Channel ID assignment for common E-DCH transmission, according to some embodiments.

FIG. 9 is a flowchart showing a method in a wireless terminal that uses a network-wide identity, according to some embodiments.

DETAILED DESCRIPTION

Figure 1:
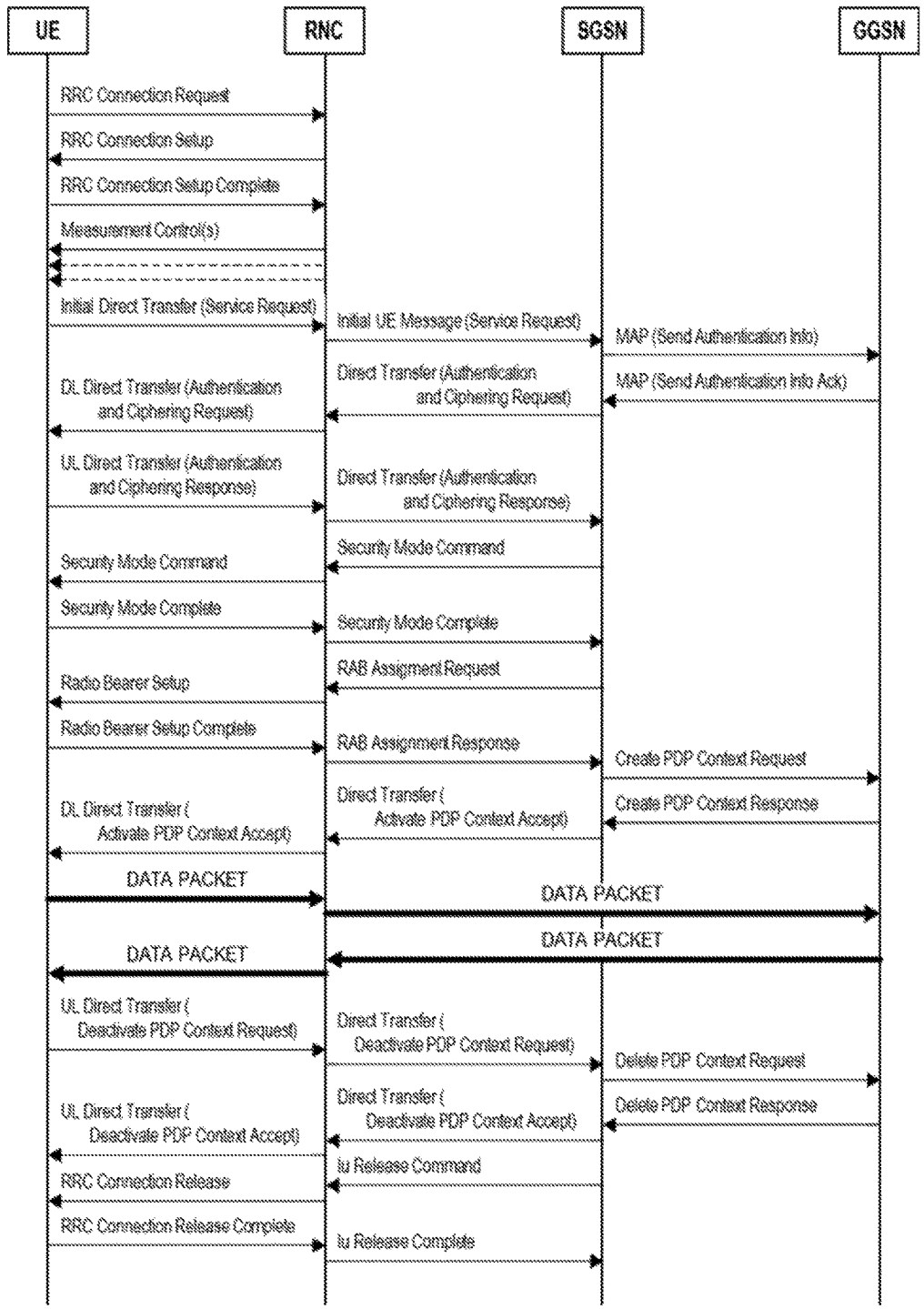
FIG. 1 illustrates an example transmission from a UE initially in IDLE mode, for the exchange of a small number of data packets between the UE and a server.
Figure 2:
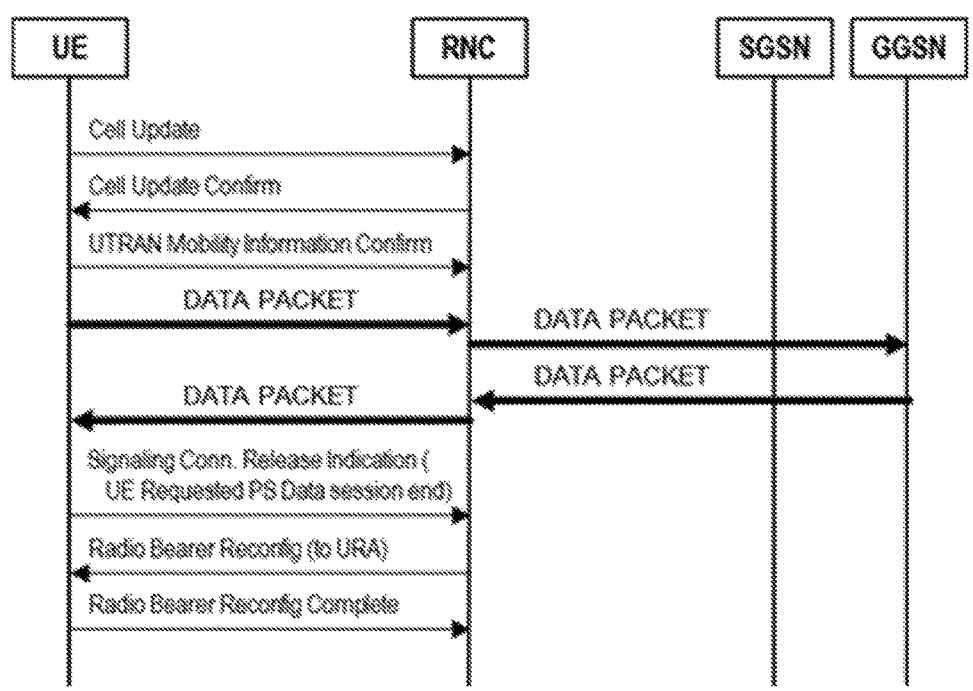
FIG. 2 illustrates an example transmission from a UE initially in URA_PCH, for exchange of a small number of data packets between a wireless terminal and a server.
Figure 3:
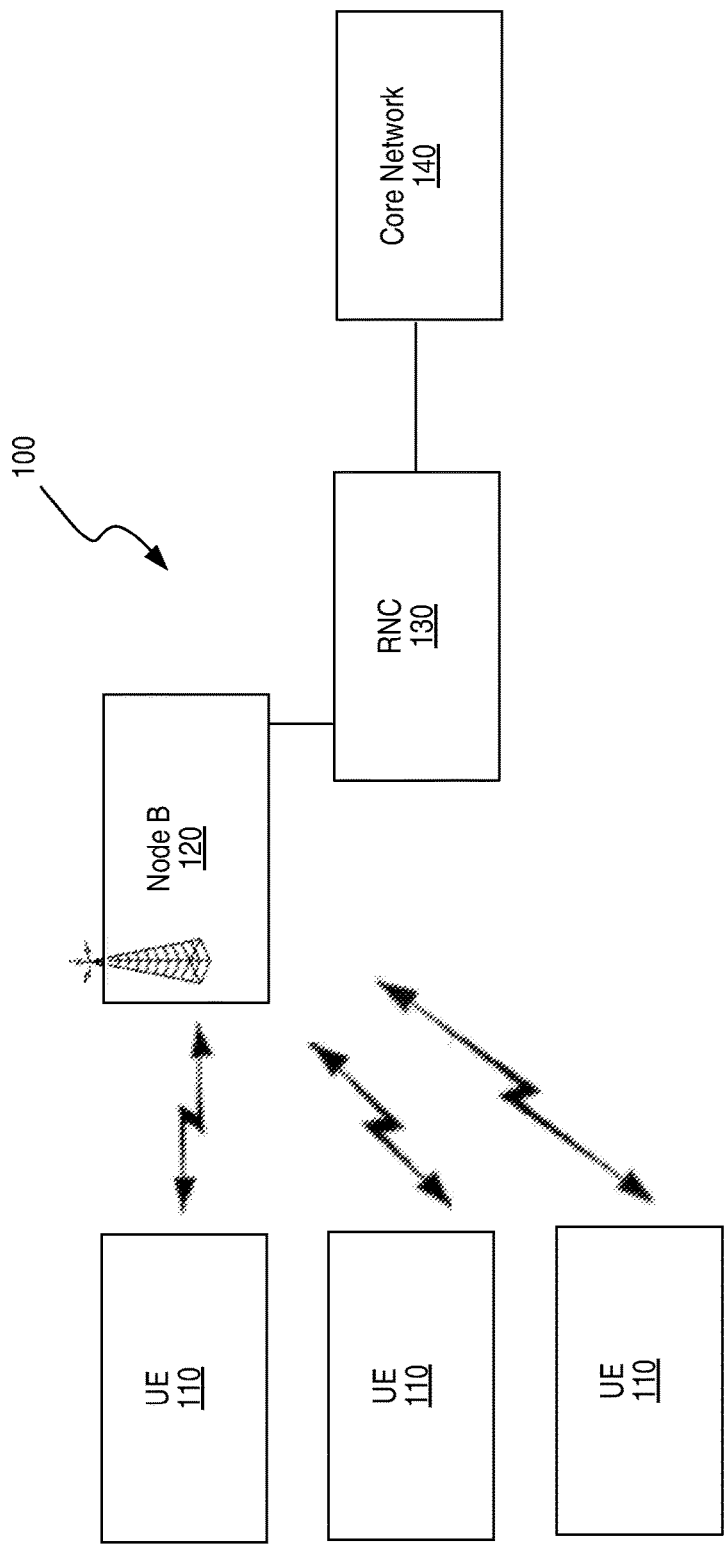
FIG. 3 illustrates a diagram of an example wireless communication system in which the techniques described herein can be performed.

An example third generation communications system 100 is shown in FIG. 3. The system 100 includes a plurality of UEs 110 that communicate with a network node 120, such as a base station or "Node B" through a radio air interface.

The network node 120 is controlled by a radio network controller (RNC) 130 and connected to a core network 140. It will be appreciated that a given network will typically include many base stations, grouped into registration areas, known as URAs in, for example, an UMTS network.

Cell-specific user identities are currently required for data transmission in a cell when the UE is configured with common E-DCH transmission in CELL_FACH or CELL_PCH. In a UMTS radio network, these identities are realized as the C-RNTI, H-RNTI, and E-RNTI. In addition to identifying the communication device to the cell, they also provide shorter identities than the UE-specific ones such as the international mobile subscriber identity (IMSI) or the PLMN-wide U-RNTI and, therefore, reduce the overhead of sustained data transmission.

As noted above, transmission of data from the URA_PCH state requires a wireless terminal, such as UE 110, to first perform a Cell Update procedure, which involves the exchange of several RRC messages, typically, a CELL UPDATE on the uplink, a CELL UPDATE CONFIRM on the downlink, and a UTRAN MOBILITY INFORMATION CONFIRM on the uplink again. It is only after this signaling procedure has been completed that the UE 110 may send or receive data. This procedure introduces a considerable delay and, for the transmission of a small amount of data, a relatively large overhead.

To improve latency and to reduce the signaling overhead for transmitting small amounts of data, the techniques and apparatus described herein utilize new URA-wide identities, also known as area-specific identities, which are introduced to eliminate the need for cell-specific identities for data transmission. For example, a wireless terminal, or UE 110, may operate in the wireless communication system 100, which comprises a plurality of distinct areas, each area comprising a plurality of cells. The UE 110 has been allocated an area-specific identifier but not a cell-specific identifier. The UE 110 transmits a data packet to a network node 120 in the wireless communication system 100 on a common channel. The data packet includes a header with an identifier for the UE 110 that is area-specific. The network node 120 receives the data packet sent from the wireless terminal 110 on the common channel. The network node 120 associates the area-specific identifier for the UE 110 with a network-wide identifier for the UE 110 and handles the data packet according to the network-wide identifier. Handling the data packet may include sending and receiving data packets based on the network-wide identifier, avoiding the need to perform Cell Updates or other procedures as described above.

In a further example, the network node 120 receives, from a core network node 140, data for the UE 110 having a network-wide identifier. The network node 120 associates the network-wide identifier for the UE 110 with an area-specific identifier for the UE 110 and sends the data to the UE 110 in a data packet comprising a header with an identifier for the UE 110. The identifier is an area-specific identifier for the UE 110.

Separate identities are assumed for generic uplink and downlink scheduling. Without loss of generality, the identity for uplink scheduling will be referred to herein as the uE-RNTI, and its downlink counterpart as uH-RNTI. Compared to the 16-bit E-RNTI and H-RNTI used for cell-specific identities, the URA-wide identities need to have a larger range since they need to support wireless devices over the whole URA, which may contain from a few cells to a hundred cells or more.

On the uplink, the uE-RNTI is needed for identifying the UE 110 for data transmission on a common E-DCH. According to currently specified approaches in UMTS networks, the cell-specific E-RNTI is attached to the transmissions by means of a special MAC-i header, the MAC-i header 0, which is identified using the special Logical Channel ID 15 (binary 1111). This is shown in the header diagrams of FIG. 4. A similar method can be used for attaching the new uE-RNTI. To distinguish it from the MAC-i header 0, another special Logical Channel ID, e.g., 13 (binary 1101), can be used. This new header will be referred to herein as the MAC-i header u. It will have the same or larger size compared to the MAC-i header 0, depending on the chosen size of the uE-RNTI. Padding may also be needed to make the header octet-aligned (i.e., containing a full number of octets). The different MAC-i headers and the Logical Channel ID Assignments are shown in FIG. 4. Note that the Logical Channel ID is offset from the Logical Channel number by 1 so that LCH-ID 0 is for Logical Channel 1, LCH-ID 1 is for Logical Channel 2, etc.

One choice for defining the uE-RNTI is to define a completely new identity. Another choice is to reuse the 32-bit U-RNTI, which is unique within the whole PLMN. This approach can be implemented in one of at least two different ways. The first way is to include all 32 bits. This means that four spare bits need to be added to make the entire header octet-aligned, resulting in a 40-bit header. A second way is to truncate the first four bits from the U-RNTI, to make room for the Logical Channel ID. This is possible because the U-RNTI is made up of an RNC ID and an S-RNTI, the latter of which is unique within an RNC. Currently, the RNC ID is made up of at least ten bits, and a given URA is always completely contained within (i.e., controlled by) one RNC. So, removing four bits from the RNC ID, in the context of forming a URA-wide identity, does not result in any loss of significance.

Yet another approach is to take note of the four spare bits in the MAC-i header 0, and extend the existing E-RNTI by up to four bits, to keep the MAC-i header u at the same size as the 24-bit MAC-i header 0. This approach can be further refined by not using a new MAC-i header at all. The current MAC-i header 0 can be used to attach the uE-RNTI. The uE-RNTI is then distinguished from the regular E-RNTI by having the xE-RNTI instead of 0000 in the positions of the spare bits. The cost of this "refined" choice is that the value 0000 can no longer be used for the xE-RNTI, which reduces the number of values for the xE-RNTI from 16 to 15. These choices are also shown in FIG. 4.

The uE-RNTI is also needed on the downlink, for sending the Absolute Grant (AG) on the E-AGCH. The AG is used for collision resolution and for indicating the amount of data the wireless terminal is allowed to transmit in each transmission. The information currently carried on the E-AGCH was described above.

With the new and longer uE-RNTI, a new format for the E-AGCH can be created, with a UE Identity field that has enough bits to carry the uE-RNTI. For masking purposes, a cyclic redundancy check (CRC) with the same length as the uE-RNTI is then calculated from the AG Value and Scope bits.

To reduce the amount of changes from existing formats and procedures, the same E-AGCH format can be kept as an alternative. The extra bits needed for the longer uE-RNTI can be stolen from the AG Value and AG Scope bits by noting that the presently disclosed techniques are intended for use with small data transmissions. Since there is little need for per-HARQ-process scheduling, the AG Scope bit is not needed. Furthermore, the need for large transmissions is low, and some bits can be taken for other use. In the extreme case, both the AG Scope and the AG value may be hard-coded, so that all six bits can be used for the uE-RNTI.

With this alternative, regular wireless terminals that are allocated cell-specific E-RNTIs can also decode the AG. To avoid confusion, care must be taken in the allocation of E-RNTIs and uE-RNTIs: The lower 16 bits of the uE-RNTI must not be the same as any of the E-RNTI that has been allocated for cell-specific use, i.e., for wireless terminals in the CELL_DCH, CELL_FACH and/or CELL_PCH states. For this purpose, it may be useful to split the uE-RNTI into two parts:

uE-RNTI=(xE-RNTI,E-RNTI)

In other words, each cell in a URA needs to reserve some E-RNTIs for uE-RNTI use. Each of the reserved E-RNTI can then support up to 64 uE-RNTIs (for a 6-bit xE-RNTI). One particularly convenient choice for this alternative is to match one of the choices discussed above for uplink usage, and choose a 4-bit xE-RNTI.

The uplink and downlink alternatives presented above can be combined and summarized according to a number of options. In a first option, a new uE-RNTI is of arbitrary length. This is the most flexible option, but it requires a MAC-i header u with more bits than the MAC-i header 0 and a new E-AGCH format with more bits for the UE Identity field to fit the new uE-RNTI.

In a second option, the U-RNTI is used as the uE-RNTI. This is basically the same as in the first option but no new ID is needed. There are two alternatives for the MAC-i header u: attaching the entire U-RNTI or just the lower 28 bits.

In a third option, the E-RNTI is extended by up to 4 bits. This option requires the least amount of change. The uE-RNTI is split into 2 parts with an E-RNTI part and a 4-bit extension xE-RNTI. The extension can fits snugly into the same positions as the spare bits of the MAC-i header 0, resulting in a header with the same length. The current E-AGCH format can be kept by stealing 4 bits from the 6-bit AG fields. Furthermore, the need of a new MAC-i header can be eliminated if the xE-RNTIs are restricted to non-zero values.

In a fourth option, the E-RNTI is extended by 5 or 6 bits. This option requires a new MAC-i header u. The same E-AGCH format may be kept if the AG can be completely hardcoded or reduced to 2 values.

In an example, an URA-wide uH-RNTI may be used. The H-RNTI is used for scheduling downlink transmissions on the HS-DSCH. It is transmitted on the HS-SCCH, which carries also a number of transmission parameters, as discussed above.

For the choice of uH-RNTI, a completely new identity can be created or an existing identity such as the U-RNTI can be used. One solution for accommodating the longer uH-RNTI is to create a new format for the HS-SCCH that has enough bits in the UE-Identity field to carry the extra bits.

Another solution is to keep the same HS-SCCH format and try to steal the necessary bits from fields that are not relevant for small transmissions. Some candidates are: modulation scheme information (1 bit); transport-block size information (6 bits); hybrid-ARQ process information (3 bits); and redundancy and constellation version (3 bits). Some of these can be reduced, e.g., the transport block size and HARQ process info, and some can be completely removed, e.g., modulation scheme and redundancy info.

With this solution, it is again convenient to split the uH-RNTI into two parts:

uH-RNTI=(xH-RNTI,H-RNTI)

Like its uplink counterpart, the H-RNTI part needs to avoid the H-RNTIs that have already been allocated for cell-specific use.

One particularly attractive choice for small transmissions is to hardcode the modulation scheme to quadrature phase shift keying (QPSK) and the redundancy and constellation version to Chase combining. For small transmissions, there is very little performance difference between this and other choices. This choice then frees up four bits that can be used towards the xH-RNTI.

According to some embodiments, the RNC configures the wireless terminal and the radio base station with the functionality to use the new URA-wide identities, uH-RNTI and uE-RNTI, according to the capability of the wireless terminal and the base station. The wireless terminal's capability may be signaled to the RNC during the initial connection setup, e.g., as part of the RRC Connection Setup procedure, and cell capability is signaled during the cell setup procedure.

The actual URA-wide identities are allocated to a given wireless terminal when a wireless terminal is sent down to URA_PCH, and may be reallocated when the wireless terminal moves from one URA to another, e.g., as part of the URA Update procedure.

For solutions that preserve the current format of the transport channels that carry these identities, the network needs to reserve some E-RNTIs and H-RNTIs for URA-wide uses. In this case, the RNC will be responsible for reserving a subset of the H-RNTI and E-RNTIs that are common to all cells in a URA for URA use. The remaining H-RNTI and E-RNTI are used by the RNC and the RBS for cell-specific uses.

Figure 5:
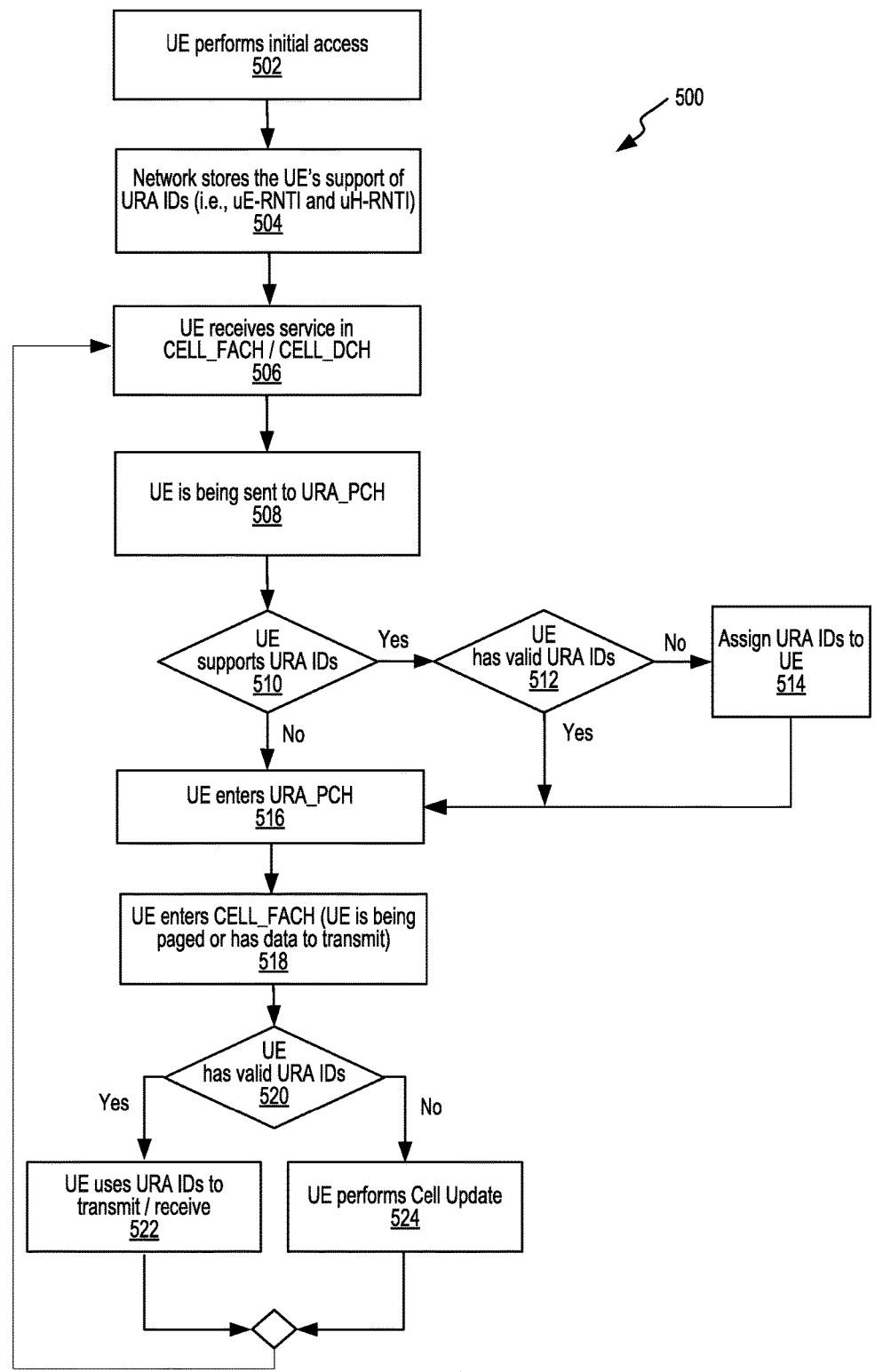
FIG. 5 is a flowchart illustrating management and usage of the URA IDs uE-RNTI and uH-RNTI, according to some embodiments.

The concept of an area-wide user identity has been introduced. These identities can be used in an area that covers many cells. Two specific identities, one for uplink transmissions and one for downlink receptions have been defined. They enable the wireless terminal to transmit and receive data in any cell within the area without the need of first obtaining cell-specific user identities. Some specific designs of the two identities have also been given. FIG. 5 is a flowchart 500 that summarizes the management and usage of such identities, according to some embodiments.

In the example of FIG. 5, a communication device or wireless terminal, such as UE 110, performs initial access (Block 502). The network stored the UE's 110 support of URA IDs, such as a uE-RNTI or uH-RNTI (Block 504). The UE 110 receives service in CELL-FACH/CELL-DCH (Block 506).

It is determined whether the UE 110 supports URA IDs (Block 510) and whether the UE 110 has valid URA IDs (Block 512). If the UE 110 supports URA IDs, but does not have valid URA IDs, one or more URA IDs are assigned to the UE 110 (Block 514). If the UE 110 does not support URA IDs, or if the UE 110 supports URA IDs and has one or more valid URA IDs, the UE 110 enters URA_PCH (Block 516). The UE 110 then enters CELL_FACH, where the UE 110 is being paged or has data to transmit (Block 518). If the UE 110 has valid URA IDs (Block 520), the UE 110 uses one or more URA IDs to transmit and/or receive data (Block 522). If the UE 110 does not have valid URA IDs, the UE 110 performs a Cell Update (Block 524). The flowchart may return to Block 506, where the UE 110 receives service in CELL_FACH/CELL_DCH.

Although the description here is made in terms of the UTRAN Registration Area of a UMTS network, the concept of a multi-cell area and area-wide user identities for cell-specific transmissions and receptions apply equally well to other types of cellular networks.

Figure 6:
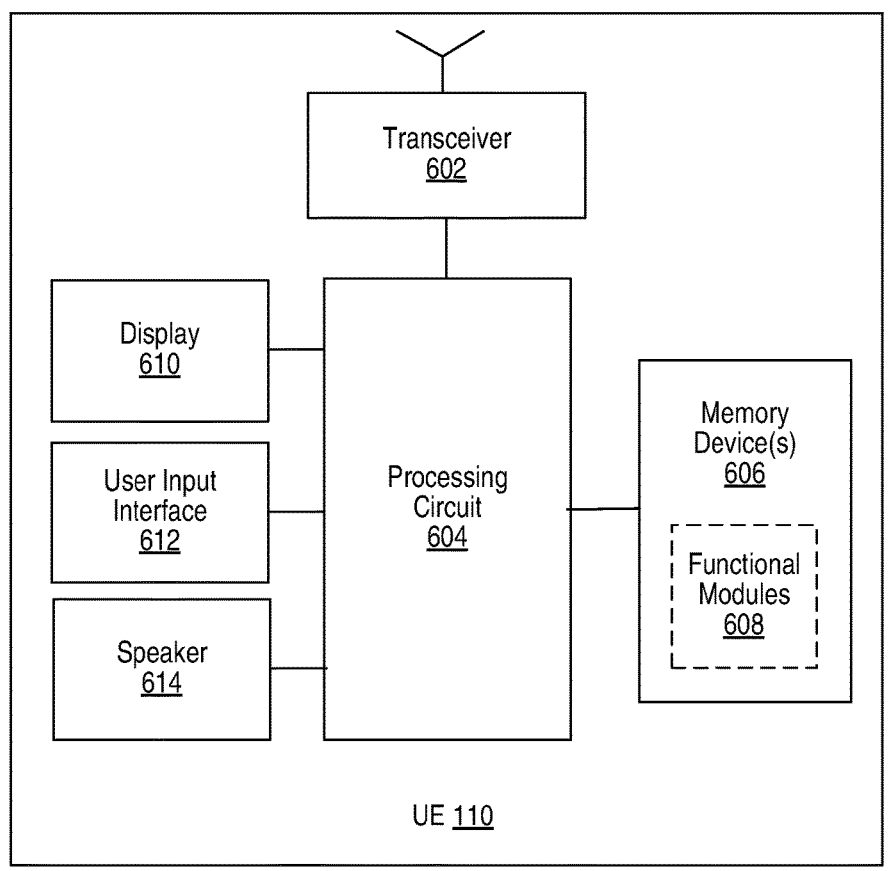
FIG. 6 is a block diagram of a UE configured to implement the techniques described herein, according to some embodiments.

In an example implementation, FIG. 6 is a block diagram of a wireless terminal such as UE 110, which is configured according to some embodiments of the presently disclosed techniques. The UE 110 includes a radio transceiver 602, a processing circuit 604 (which may alternatively be referred to, for example, as a controller circuit), and a memory device(s) 606 containing functional modules 608. The UE 110 may further include a display 610, a user input interface 612, and a speaker 614.

The transceiver 602 may be configured to operate in a WCDMA network or a Long Term Evolution (LTE) network. The transceiver 602 may also be any other cellular transceiver, Bluetooth transceiver, WiFi transceiver, WiMax transceiver, etc. that is configured to communicate with a network node 120 of the communication system 100 or another communication system. The processing circuit 604 may include one or more data processing circuits, such as a general purpose and/or special purpose processor (e.g., microprocessor and/or digital signal processor). The processing circuit 604 is configured to execute computer program instructions from the functional modules 608 of the memory device(s) 606, described below as a computer readable medium, to perform at least some of the operations and methods described herein as being performed by a wireless terminal.

Figure 7:
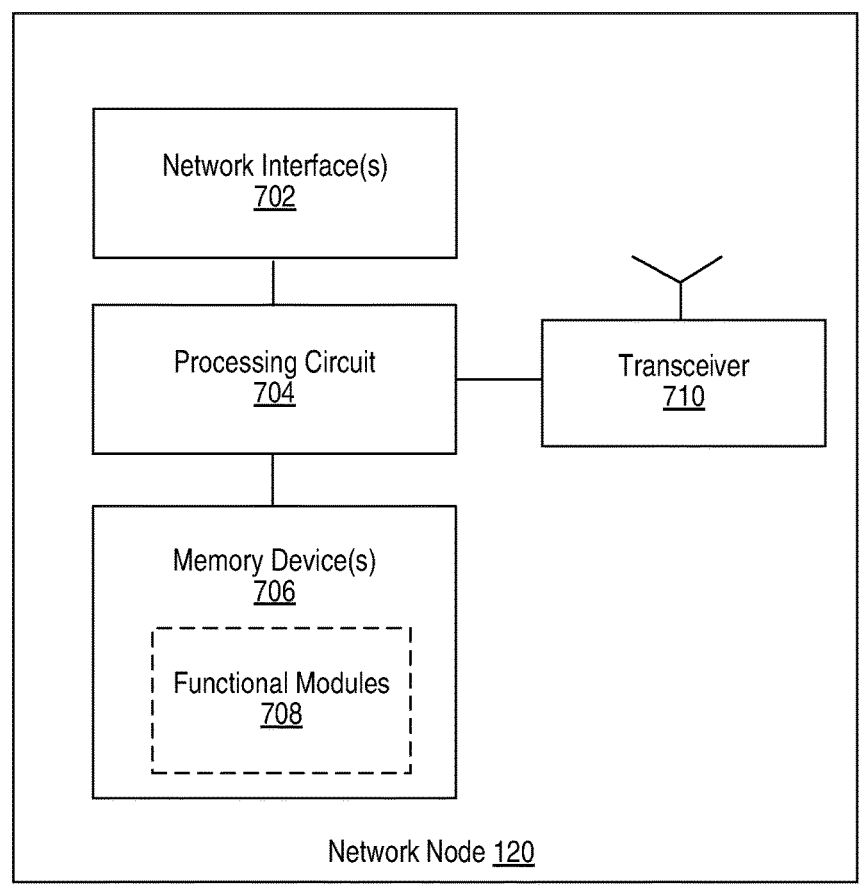
FIG. 7 is a block diagram of a network node configured to implement the techniques described herein, according to some embodiments.

In a corresponding example implementation, FIG. 7 is a block diagram of the network node 120, which is configured according to some embodiments described herein. The network node 120 includes a radio transceiver 710 configured for communication with one or more UEs, such as UE 110. The network node 120 also includes a network interface 702, which includes circuitry configured to communicate with one or more other network nodes, such as the RNC 130 shown in FIG. 3. The network node 120 further includes a processing circuit 704 and a memory device(s) 706 containing functional modules 708. The transceiver 710 may be configured to operate in a WCDMA network or an LTE network, or operate as any other cellular transceiver, Bluetooth transceiver, WiFi transceiver, WiMax transceiver, etc. that is configured to communicate with the UE 110 or another node of the communication system 100 or another communication system. The processing circuit 704 may include one or more data processing circuits, such as a general purpose and/or special purpose processor (e.g., microprocessor and/or digital signal processor). The processing circuit 704 is configured to execute computer program instructions from the functional modules 708 of the memory device(s) 706, described below as a computer-readable medium, to perform at least some of the operations and methods described herein as being performed by a network node. The network interface 702 includes circuitry for communicating with the RNC 130 and/or the core network 140, also shown in FIG. 3.

Figure 8:
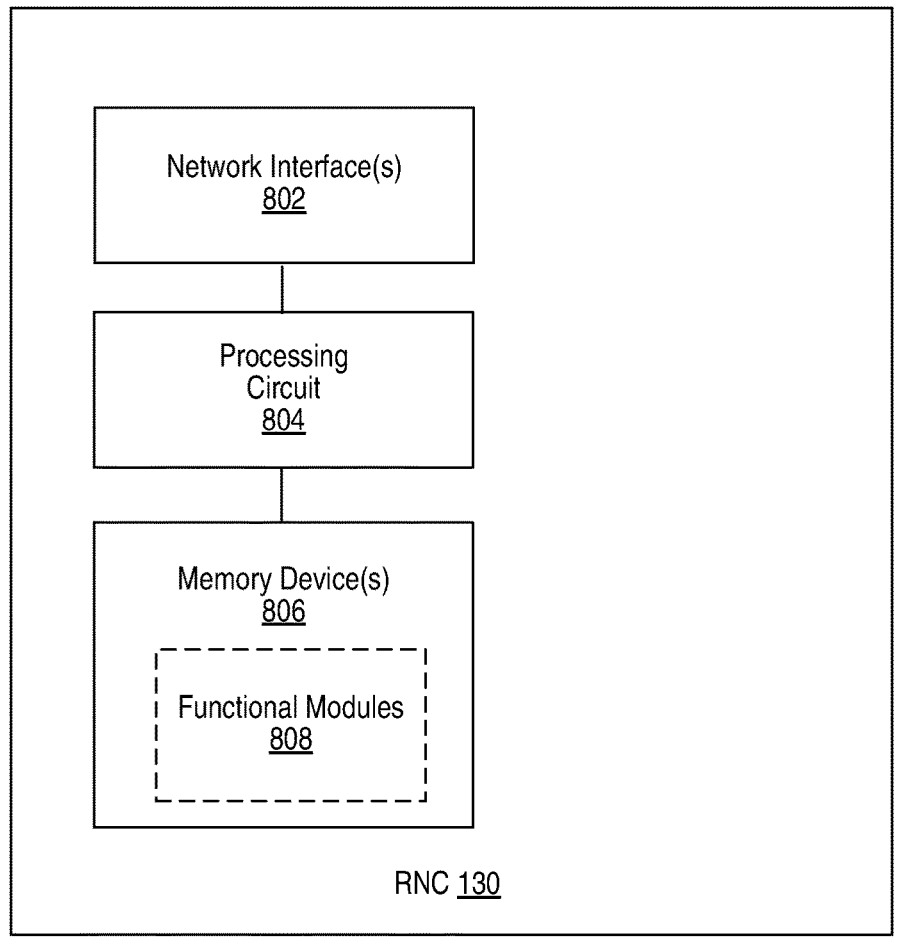
FIG. 8 is a block diagram of an RNC configured to implement the techniques described herein, according to some embodiments.

In a related example implementation, FIG. 8 is a block diagram of an RNC, such as the RNC 130 of FIG. 3 or another network node that is configured according to some embodiments. The RNC 130 includes a network interface 802 with circuitry configured to communicate with one or more other network nodes 120. The RNC 130 also includes a processing circuit 804 and a memory device 806 containing functional modules 808. The processing circuit 804 may include one or more processing circuits, such as a general purpose and/or special purpose processor (e.g., microprocessor and/or digital signal processor). The processing circuit 804 is configured to execute computer program instructions from the functional modules 808 of the memory device(s) 806, described below as a computer-readable medium, to perform at least some of the operations and methods described herein as being performed by a network node. The network interface 802 communicates with one or more network nodes 120 and/or the core network 140.

It will be appreciated that several of the techniques described herein may be implemented in a combination of network nodes, e.g., by a Node B 120 acting in concert with an RNC 130, such that each of the cooperating nodes performs all or part of one or more of the operations described herein.

Several of the embodiments described above include processing circuits configured to carry out one or more of the techniques described in detail above where the processing circuits are configured, e.g., with appropriate program code stored in memory circuits, to carry out the operations described above. While some of these embodiments are based on a programmed microprocessor or other programmed processing element, it will be appreciated, as noted above, that not all of the steps of these techniques are necessarily performed in a single microprocessor or even in a single module. It will be further appreciated that embodiments of the presently disclosed techniques further include computer program products for application in an appropriate network node.

As used herein, the term "processor" may in some examples refer to a processing circuit, such as a processing unit, a processing module, an Application Specific integrated Circuit (ASIC), a Field-Programmable Gate Array (FPGA) or the like. The processing circuit or the like may comprise one or more processor kernels. In these examples, the processing module is thus embodied by a hardware module. In other examples, the processing module may be at least partly embodied by one or more software module. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

Regardless of its implementation details, a wireless terminal, such as UE 110, in one or more embodiments operates in a wireless communication system 100 comprising a plurality of distinct areas, each area comprising a plurality of cells and is configured to perform a method such as shown in FIG. 9. The UE 110 has been allocated an area-specific identifier but not a cell-specific identifier. The method 900 includes transmitting a data packet to a network node 120 in the wireless communication system 100, on a common channel (Block 902). The data packet includes a header with an identifier for the UE 110, and the identifier is an area-specific identifier for the UE 110.

In some embodiments, the header includes a logical channel identifier that indicates that the header contains an area-specific identifier. The area-specific identifier may include a U-RNTI for the UE 110, or part of, but less than all of, a U-RNTI for the UE 110. The area-specific identifier may include an S-RNTI, and part of, but less than all of, an RNC identifier from the U-RNTI. The area-specific identifier may include an E-RNTI for the UE 110. In some cases, the size of the E-RNTI may not change (zero bits). In other cases, the E-RNTI may include additional bits. The additional bits may correspond to spare bits in a MAC-i header 0.

The method 900 may also include receiving an absolute grant (AG) message from the network node 120. The AG message may include a wireless terminal identifier field derived from the area-specific identifier for the UE 110. The area-specific identifier may include an H-RNTI for the UE 110, which may include no additional bits, or one or more additional bits. The method 900, according to some embodiments, includes sending an HS-SCCH message to the UE 110. The HS-SCCH message includes a wireless terminal identifier field derived from the area-specific identifier for the UE 110.

According to some embodiments, the method 900 includes transmitting a capability indicator to the wireless communication system 100. The capability indicator indicates that the UE 110 supports usage of area-specific identifiers. The method 900 may also include transitioning from a dormant state to a different or non-connected state from which data can be transmitted, prior to transmitting the data packet to the network node 120. The dormant state may be a URA_PCH state and the different state may be a CELL_FACH state. In some cases, as shown by FIG. 5, the UE 110 can transition based on whether the UE 110 supports URA IDs or has valid URA IDs.

Figure 10:
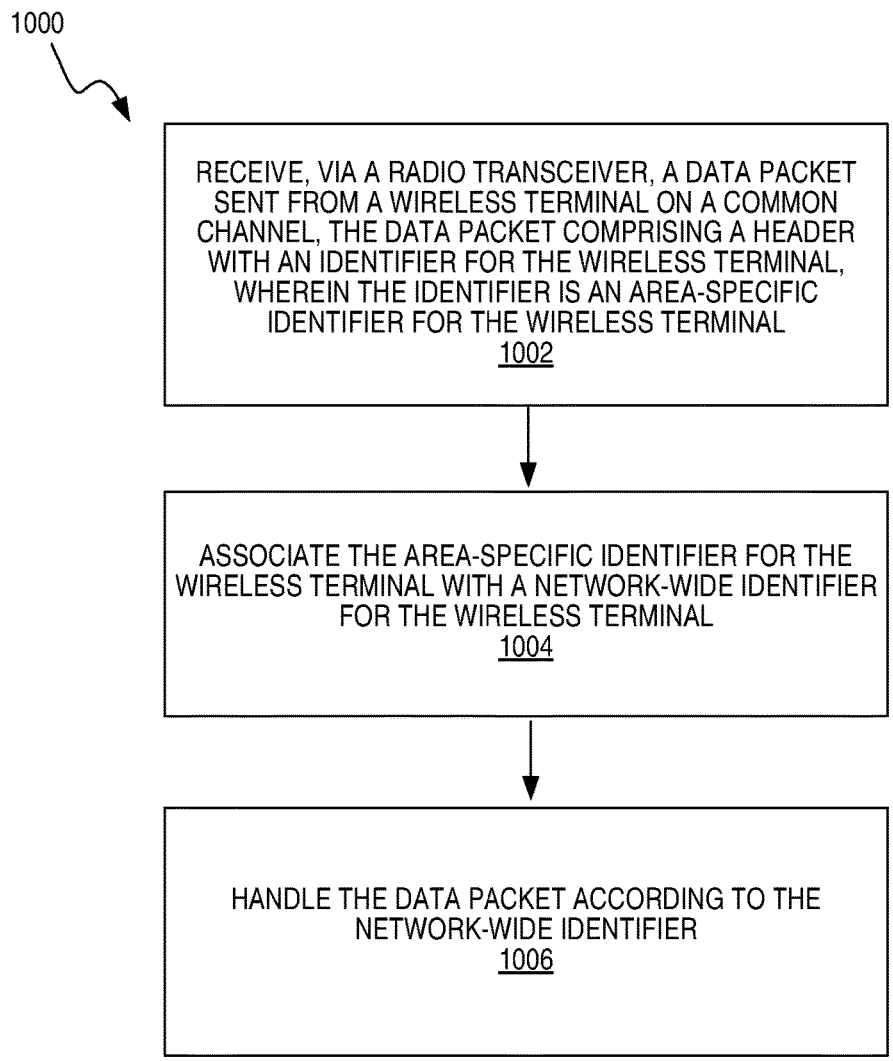
FIG. 10 is a flowchart showing a method in a network node for using a network-wide identity for a wireless terminal, according to some embodiments.

Regardless of its implementation details, the network node 120 in one or more embodiments is configured to perform a method such as shown in FIG. 10. The network node 120 is configured for use in a wireless communication system 100 comprising a plurality of distinct areas, each area comprising a plurality of cells. The method 1000 includes receiving a data packet sent from a UE 110 on a common channel (Block 1002). The data packet includes a header with an identifier for the UE 110, and the identifier is an area-specific identifier for the UE 110. The method 1000 also includes associating the area-specific identifier for the UE 110 with a network-wide identifier for the UE 110 (Block 1004) and handling the data packet according to the network-wide identifier (Block 1006).

In some embodiments, the area-specific identifier is identified as such by determining that a logical channel identifier in the header indicates that the header contains an area-specific identifier. The method 1000 may include sending an AG message to the UE 110, where the AG message includes a wireless terminal identifier field derived from the area-specific identifier for the UE 110. In some cases, the wireless terminal identifier field includes one or more bits stolen from other fields in a conventional HS-SCCH message format.

Figure 11:
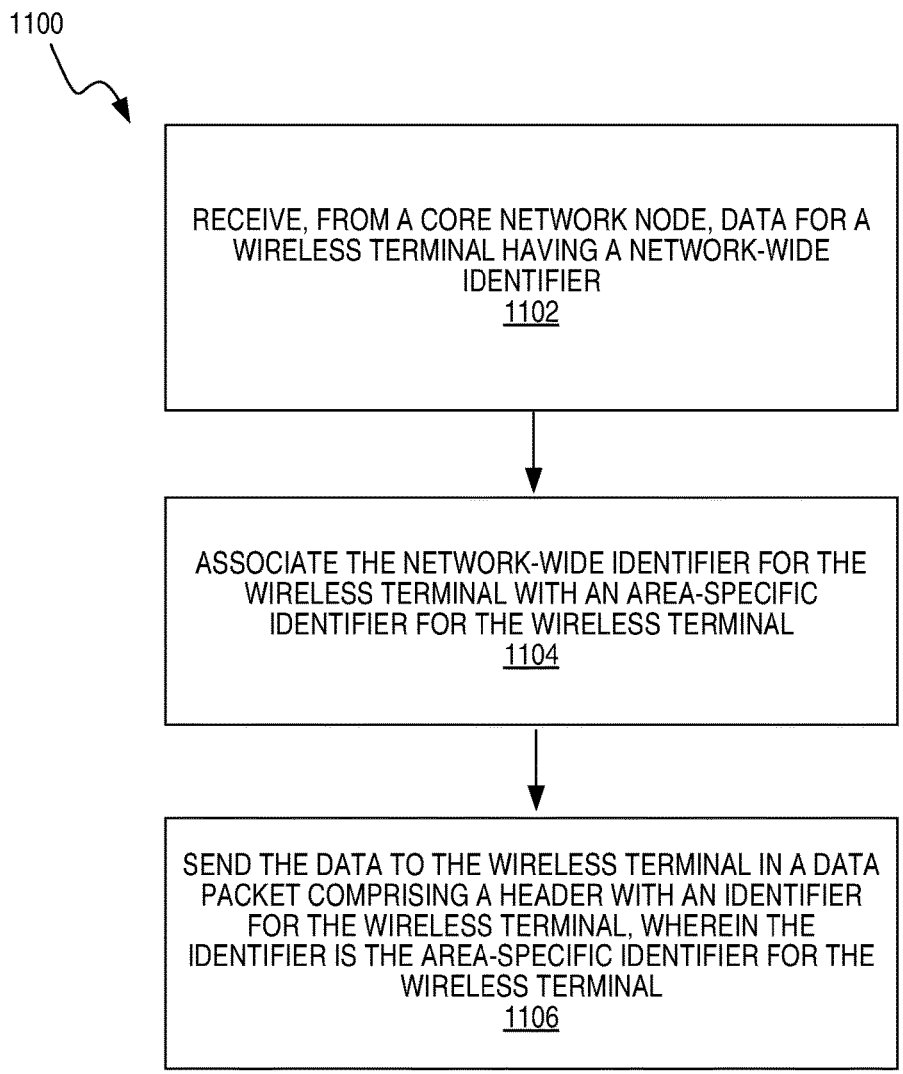
FIG. 11 is a flowchart showing a method in an RNC for using a network-wide identity for a wireless terminal, according to some embodiments.

Regardless of its implementation details, the network node 120, or the RNC 130, in one or more embodiments is configured to perform a method such as shown in FIG. 11. The RNC 130 is for use in a wireless communication system 100 comprising a plurality of distinct areas, each area comprising a plurality of cells. The method 1100 includes receiving, from a core network node 140, data for a UE 110 having a network-wide identifier (Block 1102). The method 1100 includes associating the network-wide identifier for the UE 110 with an area-specific identifier for the UE 110 (Block 1104) and sending the data to the UE 110 in a data packet comprising a header with an identifier for the UE 110 (Block 1106). The identifier is the area-specific identifier for the UE 110.

Either of the methods 1000, 1100 may include receiving, from the UE 110, a capability indicator indicating that the UE 110 supports usage of area-specific identifiers. The methods 1000, 1000 may also include receiving an initial access attempt from the UE 110, allocating the area-specific identifier to the UE 110 and storing the area-specific identifier for subsequent use.

Figure 12:
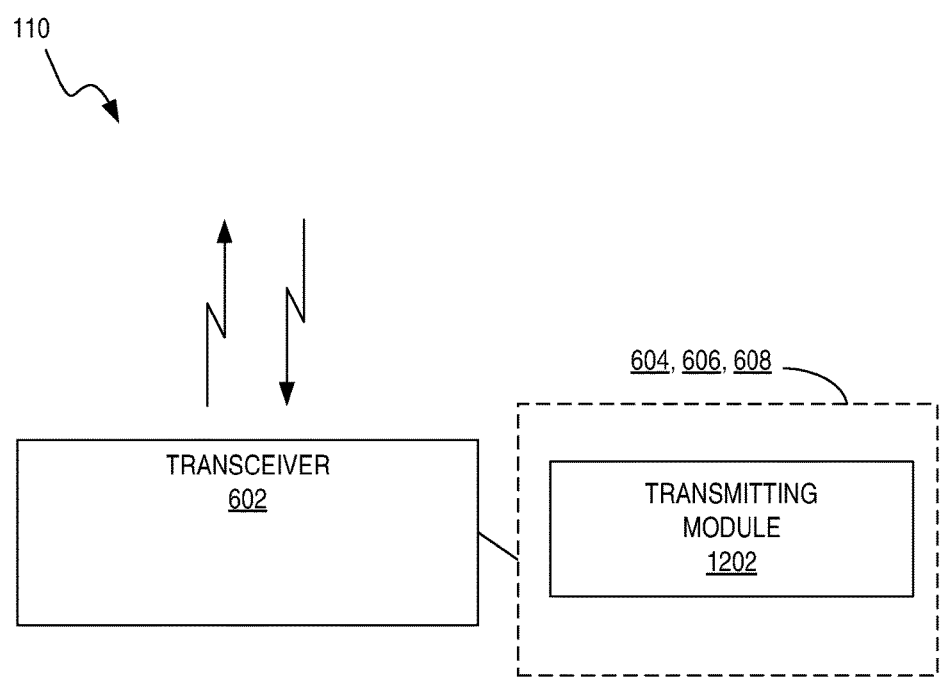
FIG. 12 is a block diagram showing a functional implementation in a UE, according to some embodiments.

Various aspects of the above-described embodiments can also be understood as being carried out by functional "modules," or "units," which may be program instructions executing on an appropriate processor circuit, hard-coded digital circuitry and/or analog circuitry, or appropriate combinations thereof. For example, FIG. 12 illustrates an example functional module 608 or circuit architecture as may be implemented in a UE 110, e.g., based on the processing circuit 604 and the memory device 606. The UE 110 operates in a wireless communication system 100 comprising a plurality of distinct areas, each area comprising a plurality of cells, and the UE 110 has been allocated an area-specific identifier but not a cell-specific identifier. The illustrated embodiment at least functionally includes a transmitting module 1202 for transmitting a data packet to a network node in the wireless communication system 100, on a common channel, the data packet comprising a header with an identifier for the UE 110, wherein the identifier is an area-specific identifier for the UE 110.

Figure 13:
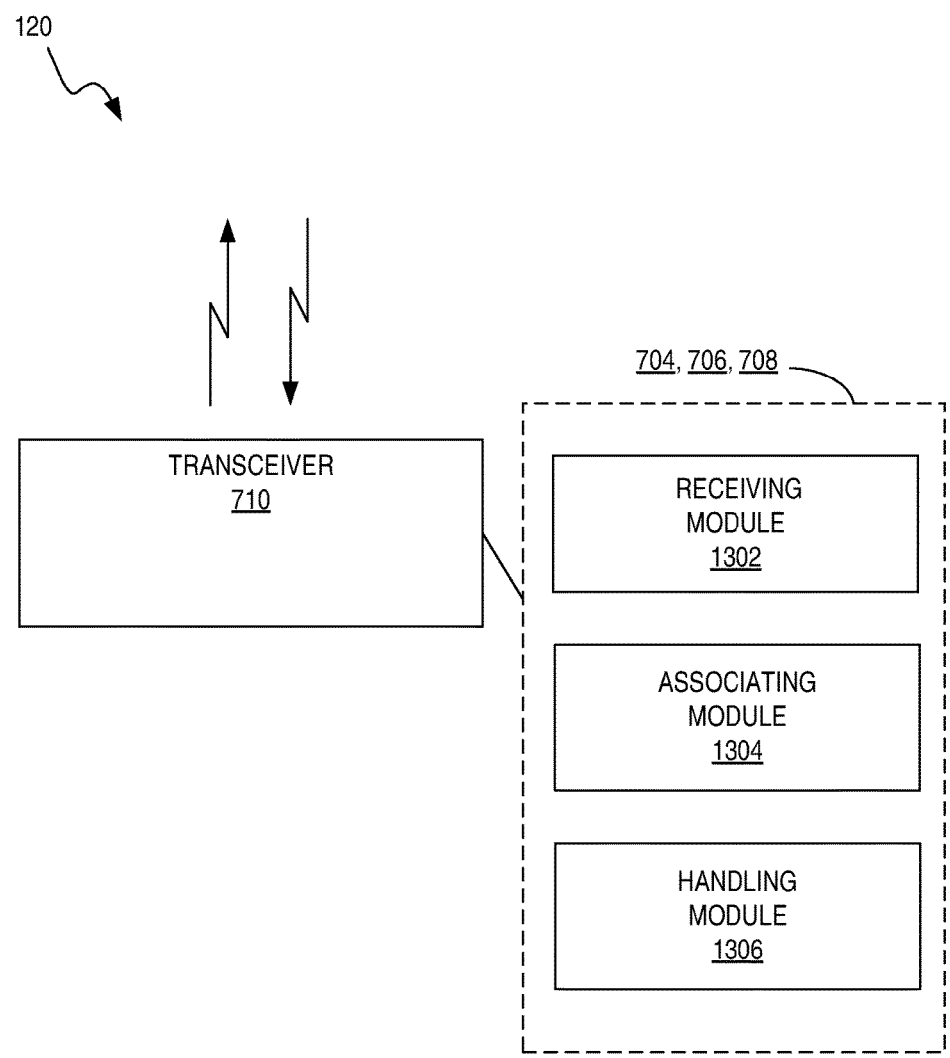
FIG. 13 is a block diagram showing a functional implementation in a network node, according to some embodiments.

In another example, FIG. 13 illustrates example functional modules 708 or circuit architecture as may be implemented in a network node, e.g., based on the processing circuit 704 and the memory device 706. The network node 120 is for use in a wireless communication system 100 comprising a plurality of distinct areas, each area comprising a plurality of cells. The implementation includes a receiving module 1302 for receiving a data packet sent from a UE 110 on a common channel, the data packet comprising a header with an identifier for the UE 110, wherein the identifier is an area-specific identifier for the UE 110. The implementation also includes an associating module 1304 for associating the area-specific identifier for the UE 110 with a network-wide identifier for the UE 110 and a handling module 1306 for handling the data packet according to the network-wide identifier.

Figure 14:
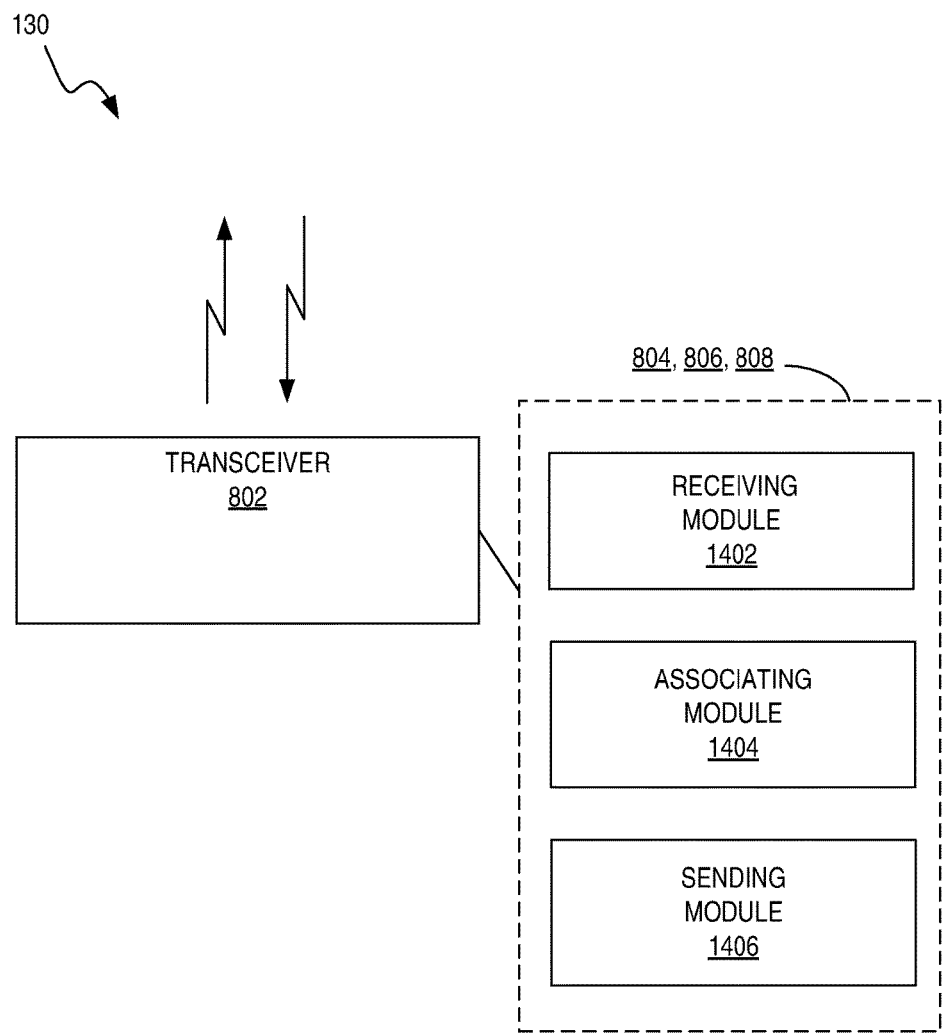
FIG. 14 is a block diagram showing a functional implementation in an RNC, according to some embodiments.

In another example, FIG. 14 illustrates example functional modules 808 or circuit architecture as may be implemented in a network node, e.g., based on the processing circuit 804 and the memory device 806. The network node may be an RNC, such as RNC 130. The RNC 130 is for use in a wireless communication system 100 comprising a plurality of distinct areas, each area comprising a plurality of cells. The implementation includes a receiving module 1402 for receiving, from a core network node 140, data for a UE 110 having a network-wide identifier. The implementation also includes an associating module 1404 for associating the network-wide identifier for the UE 110 with an area-specific identifier for the UE 110 and a sending module 1406 for sending the data to the UE 110 in a data packet comprising a header with an identifier for the UE 110, wherein the identifier is an area-specific identifier for the UE 110.

Advantages of the embodiments described herein include lower power consumption and longer lifespan for the wireless terminals and increased network capacity in terms of the ability to support many more of such devices and/or less impact of the devices on other traffic. Other advantages include enhanced performance of the wireless communications network in which UEs may be configured in different connected RRC states, including in a dormant state, such as URA_PCH, in which no cell-specific identity has been allocated to the UE.

As used herein, the terms "number", "value" may be any kind of digit, such as binary, real, imaginary or rational number or the like. Moreover, "number", "value" may be one or more characters, such as a letter or a string of letters. A "number", "value" may also be represented by a bit string. As used herein, the expression "in some embodiments" has been used to indicate that the features of the embodiment described may be combined with any other embodiment disclosed herein.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are use in a generic and descriptive sense only and not for purposes of limitation.

What is claimed is:

1. A method of operation in a radio network node of a wireless communication system, the method comprising:
   receiving an uplink data packet sent from a wireless terminal on common-channel resources of a cell associated with the radio network node, the cell being among a plurality of cells comprising a registration area of the wireless communication system, and the wireless terminal transitioning from a dormant state in the cell for transmission of the uplink data packet without performing a cell update procedure towards the radio network node;
   extracting from header information accompanying the uplink data packet an area-specific identifier previously assigned to the wireless terminal by the wireless communication system for temporarily identifying the wireless device in all cells of the registration area;
   identifying a network-wide identifier that is associated with the area-specific identifier, the network-wide identifier identifying the wireless terminal within the wireless communication system, irrespective of the cell or registration area the wireless terminal operates or resides in; and
   handling the uplink data packet according to the network-wide identifier, including forwarding the uplink data packet toward a core network node in the wireless communication system.

2. The method of claim 1, wherein the area-specific identifier comprises an extended Enhanced Dedicated Channel (eE-DCH) identifier allocated to the wireless terminal before the wireless terminal entered the dormant state, and wherein the common-channel resources of the cell are an E-DCH of the cell.

3. The method of claim 1, wherein extracting the area-specific identifier from the header information accompanying the uplink data packet comprises extracting the area-specific identifier from a Medium Access Control (MAC) header included with transmission of the uplink data packet by the wireless terminal.

4. The method of claim 1, wherein extracting the area-specific identifier from the header information accompanying the uplink data packet comprises extracting a first identifier part comprising a predefined cell-specific temporary identifier that, with respect to the cell, has been reserved for use in forming area-specific identifiers, and extracting a second identifier part that extends the first identifier part, for uniquely identifying the wireless terminal in the registration area.

5. The method of claim 4, wherein extracting the second identifier part comprises extracting the second identifier part from bit positions stolen from one or more other fields in the header information and using hardcoded values for one or more parameters corresponding to the stolen bit positions.

6. The method of claim 1, further comprising allocating the area-specific identifier to the wireless terminal, in advance of the wireless terminal entering the dormant state and maintaining an association between the network-wide identifier of the wireless terminal and the area-specific identifier allocated to the wireless terminal.

7. The method of claim 1, further comprising determining that the header information accompanying the data packet contains the area-specific identifier, based on recognizing a logical channel identifier included in the header information that is designated for indicating use of area-specific identifiers.

8. The method of claim 6, further comprising receiving a downlink data packet from the core network, for delivery to the wireless terminal, as identified by the network-wide identifier of the wireless terminal, identifying the area-specific identifier associated with the wireless terminal, and transmitting the downlink data packet over an air interface of the wireless communication system, for reception by the wireless terminal, or sending the downlink data packet to another network node in the wireless communication system for such transmission, including using the area-specific identifier to identify the transmission as targeted to the wireless terminal.

9. The method of claim 1, wherein the area-specific identifier comprises an uplink area-specific identifier for use by the wireless terminal when transmitting uplink data packets after transitioning from the dormant state and without performing a cell update procedure, and a downlink area-specific identifier, for use by the wireless communication system when transmitting downlink data packets for the wireless terminal.

10. A network node configured for operation in a radio network node of a wireless communication system, the network node comprising:
    communication circuitry configured for communicating directly or indirectly with wireless terminal in one or more cells of the wireless communication system; and
    processing circuitry associated with the communication circuitry and configured to:
      receive an uplink data packet sent from a wireless terminal on common-channel resources of a cell associated with the radio network node, the cell being among a plurality of cells comprising a registration area of the wireless communication system, and the wireless terminal transitioning from a dormant state in the cell for transmission of the uplink data packet without performing a cell update procedure towards the radio network node;

extract from header information accompanying the uplink data packet an area-specific identifier previously assigned to the wireless terminal by the wireless communication system for temporarily identifying the wireless device in all cells of the registration area;

identify a network-wide identifier that is associated with the area-specific identifier, the network-wide identifier identifying the wireless terminal within the wireless communication system, irrespective of the cell or registration area the wireless terminal operates or resides in; and handle the uplink data packet according to the network-wide identifier, including forwarding the uplink data packet toward a core network node in the wireless communication system.

11. The network node of claim 10, wherein the area-specific identifier comprises an extended Enhanced Dedicated Channel (eE-DCH) identifier allocated to the wireless terminal before the wireless terminal entered the dormant state, and wherein the common-channel resources of the cell are an E-DCH of the cell.

12. The network node of claim 10, wherein the processing circuitry is configured to extract the area-specific identifier from the header information accompanying the uplink data packet by extracting the area-specific identifier from a Medium Access Control (MAC) header included with transmission of the uplink data packet by the wireless terminal.

13. The network node of claim 10, wherein the processing circuitry is configured to extract the area-specific identifier from the header information accompanying the uplink data packet by extracting a first identifier part comprising a predefined cell-specific temporary identifier that, with respect to the cell, has been reserved for use in forming area-specific identifiers, and extracting a second identifier part that extends the first identifier part, for uniquely identifying the wireless terminal in the registration area.

14. The network node of claim 10, wherein the processing circuitry is configured to extract the second identifier part comprises extracting the second identifier part from bit positions stolen from one or more other fields in the header information and use hardcoded values for one or more parameters corresponding to the stolen bit positions.

15. The network node of claim 10, wherein the processing circuitry is configured to allocate the area-specific identifier to the wireless terminal, in advance of the wireless terminal entering the dormant state and maintain an association between the network-wide identifier of the wireless terminal and the area-specific identifier allocated to the wireless terminal.

16. The network node of claim 10, wherein the processing circuitry is configured to determine that the header information accompanying the data packet contains the area-specific identifier, based on recognizing a logical channel identifier included in the header information that is designated for indicating use of area-specific identifiers.

17. The network node of claim 16, wherein the processing circuitry is configured to receive, via the communication circuitry or via further communication circuitry included in the network node, a downlink data packet from the core network, for delivery to the wireless terminal, as identified by the network-wide identifier of the wireless terminal, identify the area-specific identifier associated with the wireless terminal, and transmit the downlink data packet over an air interface of the wireless communication system, for reception by the wireless terminal, or send the downlink data packet to another network node in the wireless communication system for such transmission, including using the area-specific identifier to identify the transmission as targeted to the wireless terminal.

18. The network node of claim 10, wherein the network node comprises at least one of a Radio Network Controller (RNC) in communication with the wireless terminal, and a Radio Base Station (RBS) operating under control of the RNC and providing radio coverage in the cell in which the wireless terminal is operating.

19. The network node of claim 10, wherein the area-specific identifier comprises an uplink area-specific identifier for use by the wireless terminal when transmitting uplink data packets after transitioning from the dormant state and without performing a cell update procedure, and a downlink area-specific identifier, for use by the wireless communication system when transmitting downlink data packets for the wireless terminal.

* * * * *